(12) United States Patent
Peterson et al.

(10) Patent No.: US 9,608,284 B2
(45) Date of Patent: Mar. 28, 2017

(54) DYNAMICALLY CONTROLLED HEAT EXCHANGE FOR CASCADING STARTUP OF FUEL CELL GRIDS

(71) Applicant: Microsoft Technology Licensing, LLC, Redmond, WA (US)

(72) Inventors: Eric C. Peterson, Woodinville, WA (US); Sean M. James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 14/446,854

(22) Filed: Jul. 30, 2014

(65) Prior Publication Data
US 2016/0036070 A1    Feb. 4, 2016

(51) Int. Cl.
| | |
|---|---|
| H01M 8/04 | (2016.01) |
| H01M 8/04007 | (2016.01) |
| H01M 8/249 | (2016.01) |
| H01M 8/04701 | (2016.01) |

(52) U.S. Cl.
CPC ... *H01M 8/04074* (2013.01); *H01M 8/04007* (2013.01); *H01M 8/04723* (2013.01); *H01M 8/249* (2013.01); *Y02E 60/50* (2013.01)

(58) Field of Classification Search
CPC .......... H01M 8/04225; H01M 8/0432; H01M 8/04716
See application file for complete search history.

(56) References Cited

U.S. PATENT DOCUMENTS

| | | |
|---|---|---|
| 6,294,278 B1 | 9/2001 | Wohr et al. |
| 6,623,880 B1 | 9/2003 | Geisbrecht et al. |
| 7,470,477 B2 | 12/2008 | Zizelman et al. |
| 7,615,299 B2 | 11/2009 | MacBain et al. |
| 8,097,374 B2 | 1/2012 | Gottmann et al. |
| 8,142,943 B2 | 3/2012 | McElroy et al. |

(Continued)

OTHER PUBLICATIONS

"International Search Report & Written Opinion Issued in PCT Application No. PCT/US2015/041938", Mailed Date: Oct. 20, 2015, 9 Pages.

(Continued)

*Primary Examiner* — Patrick Ryan
*Assistant Examiner* — Julian Anthony
(74) *Attorney, Agent, or Firm* — Alin Corie; Cassandra T. Swain; Micky Minhas

(57) ABSTRACT

A "Cascading Startup Controller" provides various techniques for quickly and efficiently initializing grids of interconnected fuel cells. In general, the Cascading Startup Controller dynamically controls heat exchange between fuel cells in the grid to produce a cascading startup of the fuel cell grid via an expanding pattern of excess thermal energy routing from hotter fuel cell stacks to cooler fuel cell stacks. This expanding pattern of excess thermal energy routing is dynamically controlled via automated valves of a heat exchange grid coupled to the fuel cell grid to decrease a total startup time for fuel cell stacks in the grid. Additional excess heat beyond that used to heat fuel cells to operational temperatures is then made available for a variety of purposes, including, but not limited to, preheating gas or other fuel for use by the fuel cells, local or community-based heating systems, heat-based energy cogeneration systems, etc.

20 Claims, 6 Drawing Sheets

Fuel Cell Grid Coupled to Dynamically Controlled Heat Exchange Grid

(56) References Cited

U.S. PATENT DOCUMENTS

| | | | |
|---|---|---|---|
| 2002/0004152 A1* | 1/2002 | Clawson | H01M 8/04022 429/412 |
| 2002/0058165 A1 | 5/2002 | Gebhardt et al. | |
| 2004/0219405 A1* | 11/2004 | Lyon | H01M 8/04186 429/430 |
| 2005/0008904 A1 | 1/2005 | Suppes | |
| 2006/0251936 A1* | 11/2006 | Black | H01M 8/04201 429/443 |
| 2008/0248353 A1 | 10/2008 | Grieve et al. | |
| 2012/0141904 A1 | 6/2012 | Badding et al. | |

OTHER PUBLICATIONS

Wimer, et al., "Molten carbonate fuel cell networks: Principles, analysis, and performance", In Proceedings of 28th Intersociety Energy Conversion Engineering Conference, Aug. 8, 1993, 7 pages.

"International Preliminary Report on Patentability Issued in PCT Application No. PCT/US2015/041938", Mailed Date: Jun. 13, 2016, 6 Pages.

* cited by examiner

DYNAMICALLY CONTROLLED HEAT EXCHANGE FOR CASCADING STARTUP OF FUEL CELL GRIDS

BACKGROUND

As is well known to those skilled in the art, a fuel cell or fuel cell stack is a device that converts the chemical energy of a reaction fuel (e.g., hydrogen gas, or hydrocarbons such as methane, propane, butane, etc.) into electrical energy through a chemical reaction with oxygen or other oxidizing agents. In the case of high-temperature fuel cells, the chemical reactions that allow such fuel cells to perform self-sustaining operations do not operate efficiently until the fuel cells have reached relatively high temperatures.

Before a high-temperature fuel cell begin producing electricity, various components of the fuel cell, and the fuel itself, are first heated to operating temperatures that enable self-sustaining chemical operations. In some fuel cell-based power generation systems, fuel reformers are used in combination with steam generators to prepare fuel for use by the fuel cells. Heating of fuel cells, fuel reformation and steam generation is typically accomplished using either electric heaters or the burning of natural gas, or a combination of both. Unfortunately, the startup process for heating fuel cells to operational temperatures before generation of electricity production begins can take a significant amount of time.

Examples of high-temperature fuel cells include, but are not limited to, solid oxide fuel cells (SOFCs), molten carbonate fuel cells (MCFCs), protonic ceramic fuel cells (PCFCs), etc. Depending on fuel cell type, efficient operating temperatures are often in the range of about 600 to 1000° C. Consequently, when starting high-temperature fuel cells, those fuel cells are first heated to a temperature where the chemical reactions can begin, which in turn helps to further heat the fuel cells to a temperature where the reaction is both self-sustaining and efficient. For example, in the case of SOFCs, the activation temperature is on the order of about 700° C.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Cascading Startup Controller," as described herein, provides various techniques for quickly and efficiently initializing grids of interconnected fuel cells. The Cascading Startup Controller dynamically controls heat exchange between fuel cells in the grid to produce a cascading startup of the fuel cell grid via an expanding pattern of excess thermal energy routing from hotter fuel cell stacks to cooler fuel cell stacks. This expanding pattern of excess thermal energy routing is dynamically controlled via automated valves of a heat exchange grid coupled to the fuel cell grid to decrease a total startup time for fuel cell stacks in the grid.

More specifically, in various implementations, the Cascading Startup Controller controls heat (i.e., thermal energy) distribution among a grid of three or more fuel cell stacks that each include one or more heat exchange systems that are in turn connected to a heat exchange grid. The heat exchange grid forms a thermal exchange pathway that interconnects the heat exchange systems of the fuel cell stacks via one or more automated valves coupled to the heat exchange grid. Note that the heat exchange grid uses any desired heat transfer medium capable of conducting heat, e.g., fluids, gases, steam, etc., to transfer thermal energy to and from the fuel cell stacks.

The heat exchangers in each fuel cell stack enable each of the fuel cell stacks to be heated to an operating temperature that allows the fuel cell stack to perform self-sustaining power generation reactions. In addition, one or more heat exchangers in each fuel cell stack are used to remove excess heat from the fuel cell stack, with that excess heat then being routed into the heat exchange grid.

Temperatures of the fuel cell stacks are monitored by the Cascading Startup Controller. The Cascading Startup Controller then uses this temperature information to dynamically control one or more of the valves of the heat exchange grid. Control of these valves allows the Cascading Startup Controller to either bypass or connect the heat exchange system of one or more fuel cell stacks to the heat exchange systems of one or more neighboring fuel cell stacks.

Control of the automated valves enables the Cascading Startup Controller to initialize a cascading startup of the fuel cell grid by automatically routing excess thermal energy from an increasing number of hotter fuel cell stacks, as additional excess thermal energy becomes available, to one or more cooler fuel cell stacks. This dynamic thermal energy routing continues until a selected number of fuel cell stacks in the grid have reached an operating temperature capable of performing self-sustaining power generation reactions. Advantageously, this cascading startup uses an expanding pattern of excess thermal energy routing from the hotter fuel cell stacks to the cooler fuel cell stacks that is dynamically controlled in a way that decreases a total startup time for the selected number of fuel cell stacks in the grid.

In view of the above summary, it is clear that the Cascading Startup Controller described herein provides various techniques for dynamically controlling heat exchange between fuel cells to produce a cascading startup of the fuel cell grid via an expanding pattern of excess thermal energy routing from hotter fuel cell stacks to cooler fuel cell stacks. In addition to the just described benefits, other advantages of the Cascading Startup Controller will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE IMPLEMENTATIONS

Figure 1:
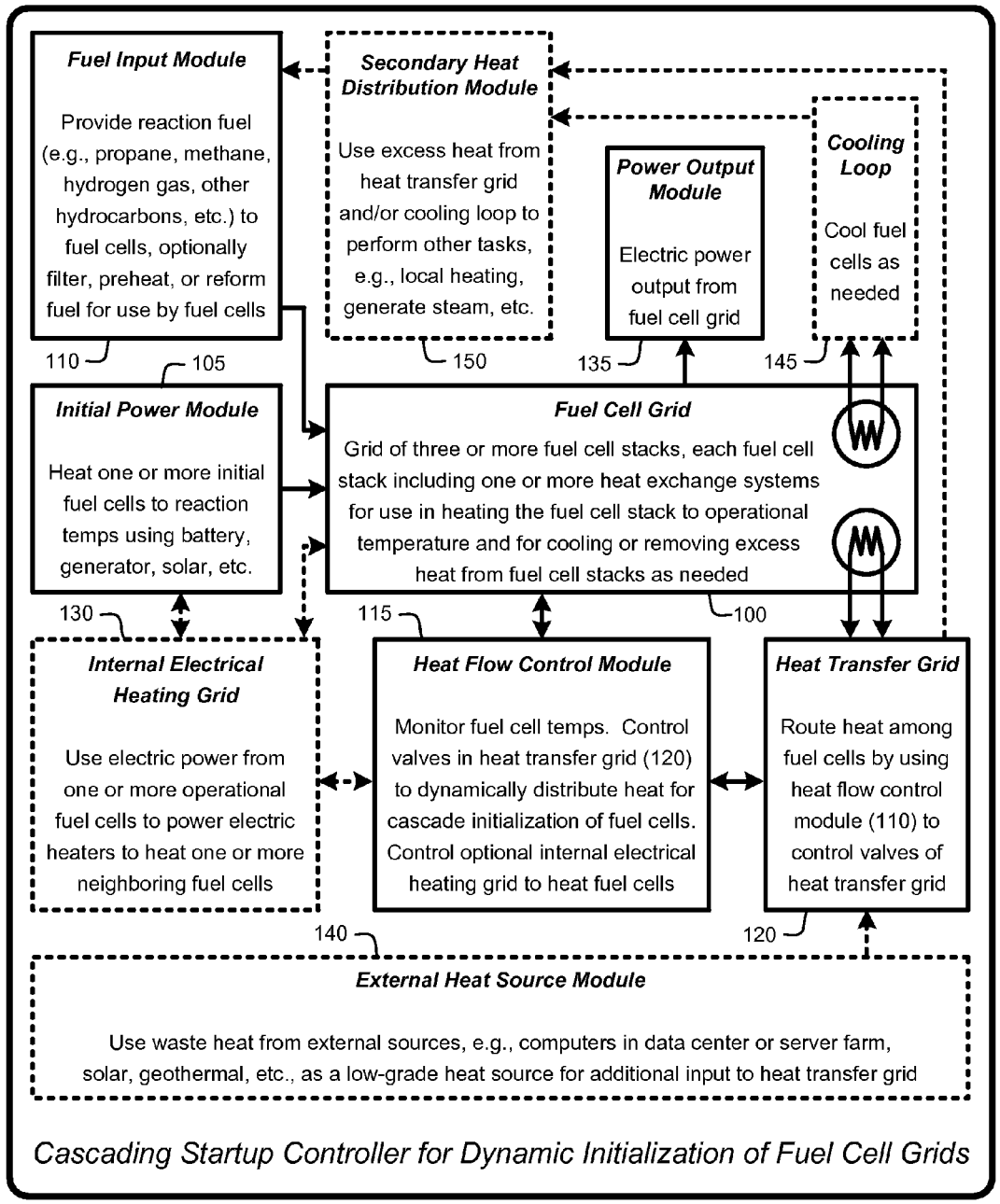
FIG. 1 provides an exemplary architectural flow diagram that illustrates program modules for implementing various implementations of the Cascading Startup Controller, as described herein.

In the following description of the implementations of the claimed subject matter, reference is made to the accompanying drawings, which form a part hereof, and in which is shown by way of illustration specific implementations in which the claimed subject matter may be practiced. It should be understood that other implementations may be utilized and structural changes may be made without departing from the scope of the presently claimed subject matter.

1.0 Introduction:

High-temperature fuel cell stacks convert the chemical energy of various hydrogen or hydrocarbon-based fuels into electrical energy through a high-temperature chemical reaction with oxygen or other oxidizing agents. Such fuel cells do not typically perform efficient or self-sustaining chemical reactions until the fuel cells have reached relatively high temperatures. Consequently, fuel cell startup or initialization generally involves bringing the temperature of the fuel cell stack up to a temperature where the energy-producing chemical reactions become self-sustaining. For example, in the case of solid oxide fuel cells (SOFCs), the activation temperature is around 700° C.

A "Cascading Startup Controller," as described herein, provides various techniques for quickly and efficiently initializing grids of interconnected fuel cells. Advantageously, the Cascading Startup Controller dynamically gates and distributes heat (i.e., thermal energy) from fuel cells in a way that allows fuel cell grids to be initialized without requiring access to external power grids for fuel cell heating. Note that the Cascading Startup Controller is applicable for use with any of a variety of high-temperature fuel cells and fuel cell stacks, including, but not limited to SOFCs, molten carbonate fuel cells (MCFCs), proton exchange membrane (PEM) fuel cells, protonic ceramic fuel cells (PCFCs), etc. However, for purposes of explanation, the Cascading Startup Controller will generally be discussed in the context of an SOFC-based fuel cell grid.

Advantageously, the fuel cell grids enabled by the Cascading Startup Controller can use any desired number of fuel cell stacks, connected in any desired arrangement, to produce any desired amount of power. Further, it should also be understood that the Cascading Startup Controller can also be used with various combinations of different types of fuel cells without departing from the intended scope of the concepts described herein.

The Cascading Startup Controller uses waste heat or electrical power from neighboring operating fuel cells in order to heat adjacent fuel cells to operational temperatures. More specifically, the Cascading Startup Controller dynamically controls thermal energy exchange between fuel cells in the grid to produce a cascading startup of the fuel cell grid via an expanding pattern of excess thermal energy routing from hotter fuel cell stacks to cooler fuel cell stacks. This expanding pattern of excess thermal energy routing is dynamically controlled via automated valves of a heat exchange grid coupled to the fuel cell grid to decrease a total startup time for fuel cell stacks in the grid.

One advantage of this expanding pattern of excess thermal energy routing is that as more thermal energy becomes available, a growing number of fuel cells begin to receive that thermal energy from the heat exchange grid. The result is an exponential growth in the number of fuel cells that are being brought up to temperature as the overall fuel cell grid is initialized. Additional excess heat beyond that used to heat fuel cells to operational temperatures is then made available for a variety of purposes, including, but not limited to, preheating gas or other fuel for use by the fuel cells, local or community-based heating systems, heat-based energy cogeneration systems, etc.

1.1 System Overview:

As noted above, the "Cascading Startup Controller," provides various techniques for dynamically controlling heat exchange between fuel cells to produce a cascading startup of the fuel cell grid via an expanding pattern of excess thermal energy routing from hotter fuel cell stacks to cooler fuel cell stacks. The processes summarized above are illustrated by the general system diagram of FIG. 1. In particular, the system diagram of FIG. 1 illustrates the interrelationships between program modules for implementing various implementations of the Cascading Startup Controller, as described herein. Furthermore, while the system diagram of FIG. 1 illustrates a high-level view of various implementations of the Cascading Startup Controller, FIG. 1 is not intended to provide an exhaustive or complete illustration of every possible implementation of the Cascading Startup Controller as described throughout this document.

In addition, it should be noted that any boxes and interconnections between boxes that may be represented by broken or dashed lines in FIG. 1 represent alternate implementations or optional components of the Cascading Startup Controller described herein. Further, any or all of these alternate implementations or optional components, as described below, may be used in combination with other alternate implementations or other components that are described throughout this document.

In general, as illustrated by FIG. 1, the processes enabled by the Cascading Startup Controller initializes a fuel cell grid 100 comprising three or more fuel cells by using an initial power module 105 to start the initialization process in one or more particular fuel cells. However, it should be noted that the Cascading Startup Controller will more typically be used with very large grids containing hundreds or even thousands of fuel cells.

More specifically the fuel cell grid includes fuel cell stacks that each include one or more heat exchange systems that are coupled to a heat transfer grid 120. These heat exchange systems are used to heat each fuel cell stack to operational temperatures, to transfer excess thermal energy into the heat transfer grid 120 for use in heating other fuel cells, and for cooling the fuel cells or removing excess heat, as needed.

During the initialization process, an initial power module 105 is used to heat one or more initial fuel cells in the fuel cell grid 100 to temperatures sufficient to begin producing energy from reaction fuel received via a fuel input module 110. This initial heating process uses an initial power source (e.g., batteries, small generators, solar cells or solar-based heat collectors, geothermal energy sources, etc.) to start at least one of the fuel cells. Advantageously, by using a locally available initial power source to initialize one or more of the fuel cells, the Cascading Startup Controller can significantly reduce, or completely remove, any dependence of the fuel cell grid 100 on local electrical power grids (e.g., city, municipal, or state-wide electrical power grids) for startup. As such, the fuel cell grid 100, and any infrastructure associated with the fuel cell grid, can be geographically located without concern for whether a local power grid is available, or whether any such grid is reliable, to support initialization of the fuel cell grid.

As noted above, the fuel input module 110 provides reaction fuel received via the fuel input module 110. In general, the fuel input module 110 provides reaction fuel (e.g., propane, methane, hydrogen, or other hydrocarbons) to the fuel cells once those fuel cells have reached temperatures that will allow then to produce electricity from the reaction fuel. Further, in various implementations, depending upon the type of reaction fuel and the type of fuel cells being used, the fuel input module 110 performs any of a number of additional operations, including, but not limited to, preheating the reaction fuel, reforming or pre-reforming the reaction fuel, filtering the reaction fuel, etc. As is well known to those skilled in the art, pre-reforming, which is often an additional process step for steam reforming, is used to convert heavier hydrocarbons, such as, for example, propane ($C_3H_8$), to a mixture of smaller molecules, such as, for example, methane ($CH_4$) and hydrogen gas ($H_2$), and carbon oxides at relatively low temperatures. This reformed reaction fuel is then provided to the fuel cells, as noted above.

Once the initial fuel cells are at temperatures sufficient to begin producing electricity from the reaction fuel, those cells will begin to generate excess heat. This excess heat is then collected and transferred to other fuel cells via the heat transfer grid 120 in an expanding pattern of cascading heat transfer. More specifically, a heat flow control module 115 monitors fuel cell temperatures, and controls dynamically controls automated valves in heat transfer grid 120. This dynamic control results in a dynamic distribution of thermal energy, beginning with the heat generated by the one or more cells initialized via the initial power module 105, which results in a cascading initialization of the entire fuel cell grid 100 (or some selected number of fuel cells in the fuel cell grid).

In various implementations, the heat flow control module 115 also controls an optional internal electrical heating grid 130 to heat fuel cells via electrical heaters coupled to the individual fuel cells. In various implementations, power for these electrical heaters is drawn from excess power generated by one or more of the fuel cells in the fuel cell grid 100 as those cells begin to produce electricity. As such, either or both heat and electrical power from one or more fuel cells are used in various implementations of the Cascading Startup Controller to drive the cascading startup of the overall fuel cell grid 100.

In general, once one or more fuel cells in the fuel cell grid 100 begin generating electricity from the reaction fuel, some or all of that electricity is output by a power output module 135 for use by any desired process (e.g., computers, lighting, refrigeration, battery charging, etc.). Further, once individual fuel cells in the grid are at operational temperatures, those fuel cells may need to be cooled to remove excess heat generated by the chemical reactions between the reaction fuel and the fuel cell stack. Consequently, in various implementations, a cooling loop 145 is used to cool the fuel cells, as needed, based on the temperatures of those fuel cells.

In various implementations of the Cascading Startup Controller, an external heat source module 140 uses waste heat from external sources, e.g., computers in data center or server farm, solar cells, geothermal energy, etc., as a low-grade heat source for additional input to heat transfer grid 120. Advantageously, such waste heat can be used for initial preheating of some or all of the fuel cells in the fuel cell grid 100. Although such heat is typically low grade, relative to the heat generated by active fuel cells, even relatively small increases in the initial temperature of the fuel cells decreases the amount of time to bring those fuel cells up to operational temperatures using high-grade heat sources.

Further, in various implementations, any excess thermal energy available in the heat transfer grid 120, such as the increasing amount of heat available as increasing numbers fuel cells come online, is provided to an optional secondary heat distribution module 150. In general, the secondary heat distribution module 150 uses excess heat from the heat transfer grid 120, and/or extracted from fuel cells by the cooling loop 145, to perform other tasks. Such tasks include, but are not limited to, local heating, generating steam, providing thermal energy and/or steam to the fuel input module for use in preheating the reaction fuel, steam reformation of the reaction fuel, pre-reformation of the reaction fuel, etc.

Note also that in various implementations, a user interface (not shown) allows a user to locally or remotely interact with any or all of the various components of the Cascading Startup Controller (e.g., individual fuel cells in the fuel cell grid 100, the heat flow control module 115, the heat transfer grid, etc.). This allows the user to start particular fuel cells, to take particular fuel cells offline, or to heat or cool those cells for particular purposes, e.g., maintenance, component testing, etc.

2.0 Operational Details of the Cascading Startup Controller:

The above-described program modules are employed for implementing various implementations of the Cascading Startup Controller. As summarized above, the Cascading Startup Controller provides various techniques for dynamically controlling thermal energy exchange between fuel cells to produce a cascading startup of the fuel cell grid via an expanding pattern of excess thermal energy routing from hotter fuel cell stacks to cooler fuel cell stacks. The following sections provide a detailed discussion of the operation of various implementations of the Cascading Startup Controller, and of exemplary methods for implementing the program modules described in Section 1 with respect to FIG. 1. In particular, the following sections provides examples and operational details of various implementations of the Cascading Startup Controller 2.1 Operational Overview and Advantages:

As noted above, the Cascading Startup Controller-based processes described herein provide various techniques for dynamically controlling thermal energy exchange between fuel cells to produce a cascading startup of the fuel cell grid via an expanding pattern of excess thermal energy routing from hotter fuel cell stacks to cooler fuel cell stacks.

Advantageously, the use of fuel cell grids, in combination with dynamically controlled heat exchange grids to capture and transfer the thermal energy generated by fuel cell stacks to initialize other fuel cells in the grid, allows much or all of the electrical infrastructure typically required for initializing such grids to be eliminated. This allows such installations such as computer data centers or server farms, factories, hospitals, or any other installation that can be adapted for use with the electrical energy generated by the a fuel cell grid, to be located in geographically advantageous areas without concerns such as local power availability, power quality, power downtime considerations, etc. In particular, the various implementations provided by the Cascading Startup Controller allow a very small initial power source (e.g., small portable generators, wind power, solar power, batteries, various mechanical electrical generation systems, etc.) to start a single fuel cell or some relatively small number of fuel cells. Excess heat from the initial fuel cell or cells is then captured and dynamically distributed via the heat exchange grid to kick off an expanding cascade of the remaining fuel cell stacks in the grid (or some desired number of fuel cells in the grid).

In various implementations, each fuel cell stack includes various connections (e.g., thermal, electrical, etc.) that allows for one or more resources (e.g., heat and/or electricity) to be shared with or distributed to one or more neighboring systems. Examples connections include, but are not limited to, electrical connections, connections for sending exhaust gasses to neighboring fuel cell stacks, thermal input to super-heated water or oil loops connected to the heat exchange grid or to a heat exchanger or the like coupled to the heat exchange grid, etc.

For example, as the first fuel cell systems start to run as they approach and reach operational temperatures, some of the electrical power and/or the exhaust gases are sent to neighboring fuel cell systems to start heating components. Once those neighboring systems start to run as they approach and reach operational temperatures, the power and gases of those systems are added to the expanding cascade. The result is a dynamically controlled heat exchange between fuel cells to produce a cascading startup of the fuel cell grid via an expanding pattern of excess thermal energy routing from hotter fuel cell stacks to cooler fuel cell stacks. For example, in the case of the exhaust gases being shared, as more fuel stacks begin to come up to temperature, an increasing volume of hot gasses available for dynamic routing to other fuel cell stacks. Automated valves coupled to the heat exchange grid control the flow of hot gasses between fuel cell stacks throughout the fuel cell grid.

Note also that in various implementations, a passive or dynamically controlled cooling grid or the like (also referred to herein as a "cooling loop") is integrated into the fuel cell grid, and/or various components associated with the fuel cell grid. The cooling grid provides cooling to one more components (e.g., fuel cells, computers, equipment racks, steam condensers, etc.) that may exceed desired temperatures during operation. Further, the cooling grid can be used to lower temperatures of various components, including fuel cells, to temperatures that are safe for workers to perform maintenance or other tasks.

Additional advantages and capabilities of the Cascading Startup Controller include, but are not limited to:
1. Optionally using electrical power generated by operational fuel cells in the fuel cell grid to power optional electrical heating elements within one or more fuel cell stacks in the fuel cell grid, thereby further decreasing fuel cell startup time;
2. Optionally using electrical power generated by operational fuel cells in the fuel cell grid to power optional electrical heating elements in one or more optional reformers for conditioning fuel to be used by fuel cells in the fuel cell grid;
3. Optionally capturing thermal energy by burning fuel cell tail pipe gasses to provide additional thermal energy input to the heat exchange grid;
4. Optionally using the heat exchange grid to collect excess or waste heat from one or more operational fuel cells, or other heat generating systems (e.g., computer data centers or server farms, geothermal energy, solar heat collectors, etc.), and using this collected waste heat for purposes including, but not limited to:
   a. Heating or preheating the fuel (e.g., natural gas, methane, hydrogen gas, etc.) used by the fuel cell stacks;
   b. Heating or preheating one or more optional pre-reformers or reformers for conditioning reaction fuel for use by the fuel cell stacks;
   c. Heating or preheating one or more of the fuel cell stacks in the grid;
   d. Generating steam for various uses, including, but not limited to, reaction fuel reformation, steam turbine cogeneration systems, water purification, etc.;
   e. Environmental heating systems;
   f. Etc.

2.2 Exemplary Fuel Cell Grid Configurations:

As noted above, fuel cell grids enabled by the Cascading Startup Controller include three or more fuel cells or fuel cells stacks that are coupled to a dynamically controlled heat exchange grid. This dynamically controlled heat exchange grid then routes thermal energy from hotter fuel cells to cooler fuel cells in an expanding pattern that reduces overall startup time for the fuel cell grid. The geometric layout of fuel cells relative to each other and in relation to the heat exchange grid is designed to facilitate heat transfer through a series of automatically controlled valves in the grid. Automated operation of these valves that allows the Cascading Startup Controller to transfer thermal energy throughout the grid in an efficient and expanding pattern.

It should be understood that any desired 2D or 3D geometry for constructing the fuel cell grid be used. Further, any one or more fuel cells in the fuel cell grid can be positioned relative to other equipment to minimize any associated electrical connectivity for powering that other equipment with electricity generated by the fuel cell grid. For example, fuel cells can be positioned adjacent to one or more computers, server racks, etc. This allows the fuel cells to provide electrical power directly to one or more computers or server racks (or other equipment) without the need to install or connect any external electrical grids, or even to construct a common electrical grid throughout a building or complex making use of the fuel cell grid. In other words, the electricity produced by one or more fuel cells can be used by equipment near those fuel cells without implementing or connecting to a broader network or grid of electrical energy.

Advantageously, such integrated layouts allow complex systems, such as, for example, data centers and the like, to be designed in combination with integrated and co-located fuel cell grids (e.g., one or more fuel cell stacks designated to power one or more neighboring server racks) and heat exchange grids. This enables efficient distribution of both thermal energy and electricity throughout the overall system, as needed, without requiring a large electrical infrastructure for distributing the electricity generated by the fuel cells. For example, by co-locating fuel cells and server racks, electrical runs from fuel cells to server racks can be measured by a few feet rather than the substantially larger and more costly electrical infrastructures typically seen in facilities such as data centers.

Figure 2:
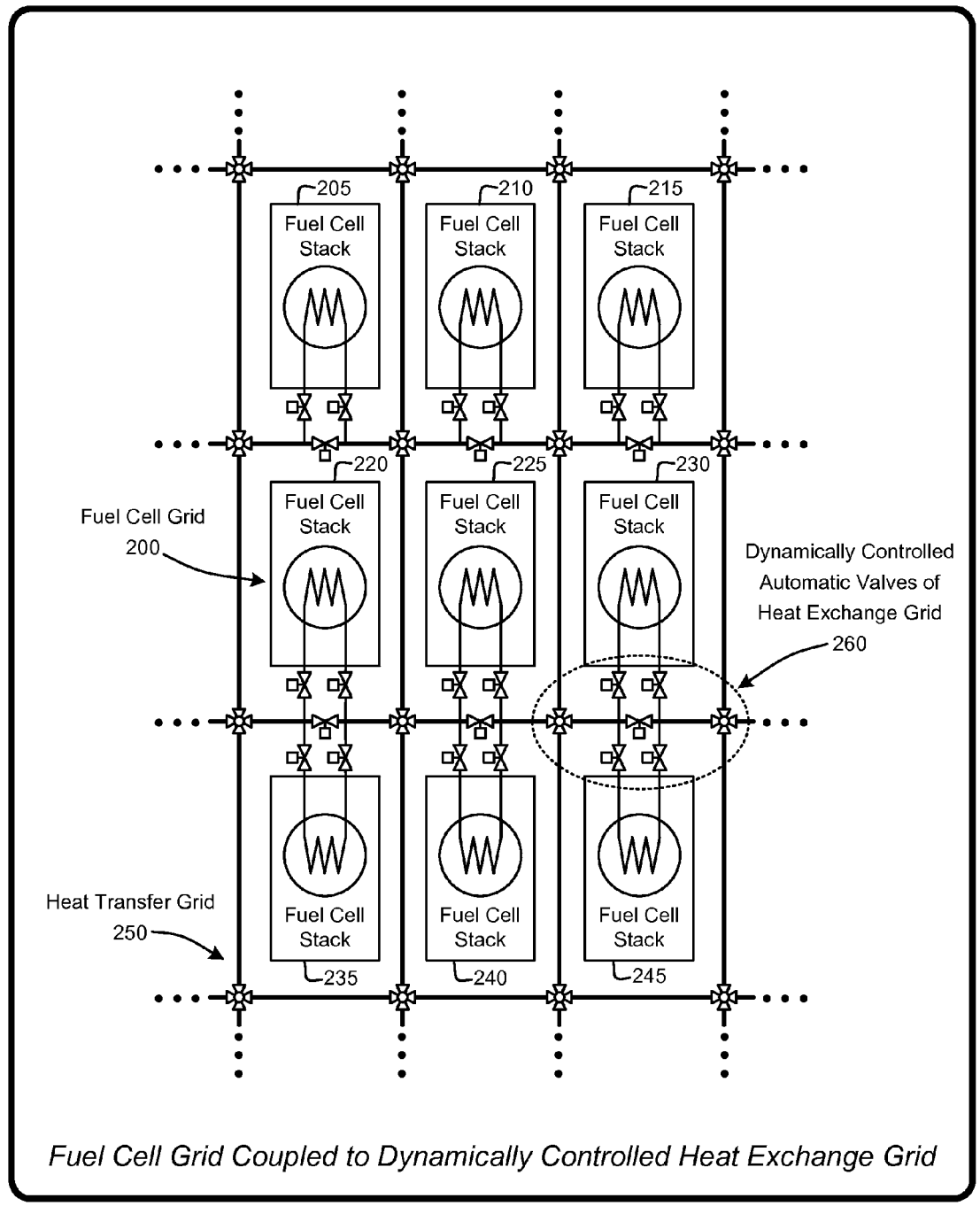
FIG. 2 provides a schematic diagram that illustrates an exemplary 2D rectangular grid of fuel cell stacks coupled to a heat transfer grid via a series of automated valves, as described herein.
Figure 3:
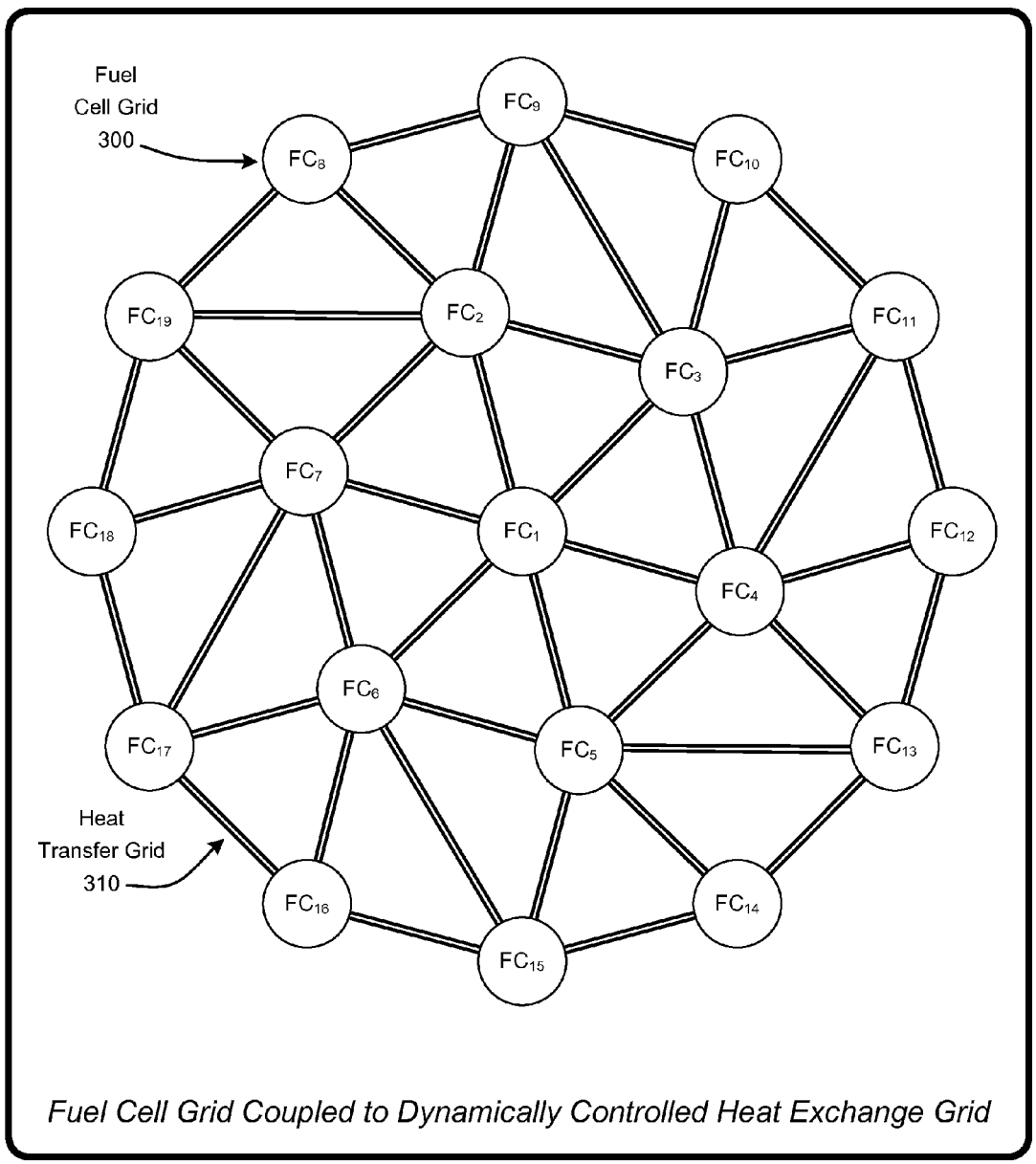
FIG. 3 provides a schematic diagram that illustrates an exemplary 2D grid of fuel cell stacks, comprising concentric circular arrays of fuel cells, coupled to a heat transfer grid via a series of automated valves, as described herein.

FIG. 2 and FIG. 3 provide simple schematic diagrams that illustrate various grids of fuel cell stacks coupled to heat transfer grids via a series of automated valves. Note that while valves are illustrated in FIG. 2, the heat transfer grid in FIG. 3 is shown without the valves for purposes of clarity in the schematic. However, it should be understood the heat transfer grid of FIG. 3 does include automated valves for controlling thermal energy transfer throughout the fuel cell grid. Again, it should be understood that the simple geometries of the fuel cell grids and heat transfer grids illustrated by FIG. 2 and FIG. 3 are provided only for purposes of illustration and discussion, and that the Cascading Startup Controller is not intended to be limited to the use of such geometries.

For example, FIG. 2 shows a 2D rectangular fuel cell grid 200 comprising a plurality of fuel cells (205 through 245). As illustrated, each fuel cell in the fuel cell grid 200 includes a heat exchanger for transferring thermal energy to or from the heat transfer grid 250. Whether or not heat (i.e., thermal energy) flows into or from fuel cells in the fuel cell grid 200 is determined by the state (i.e., open or closed) of the valves (e.g., valves 260) in the heat exchange grid 250.

FIG. 3 provides an illustration of a 2D fuel cell grid 300 comprising concentric circular arrays of fuel cells. Each of the fuel cells in this fuel cell grid 300 are coupled to multiple neighboring fuel cells via heat transfer grid 310. As noted above, this heat transfer grid 310 also includes automated valves (not shown) to allow the Cascading Startup Controller to route thermal energy through the fuel cell grid, as described herein.

Figure 4:
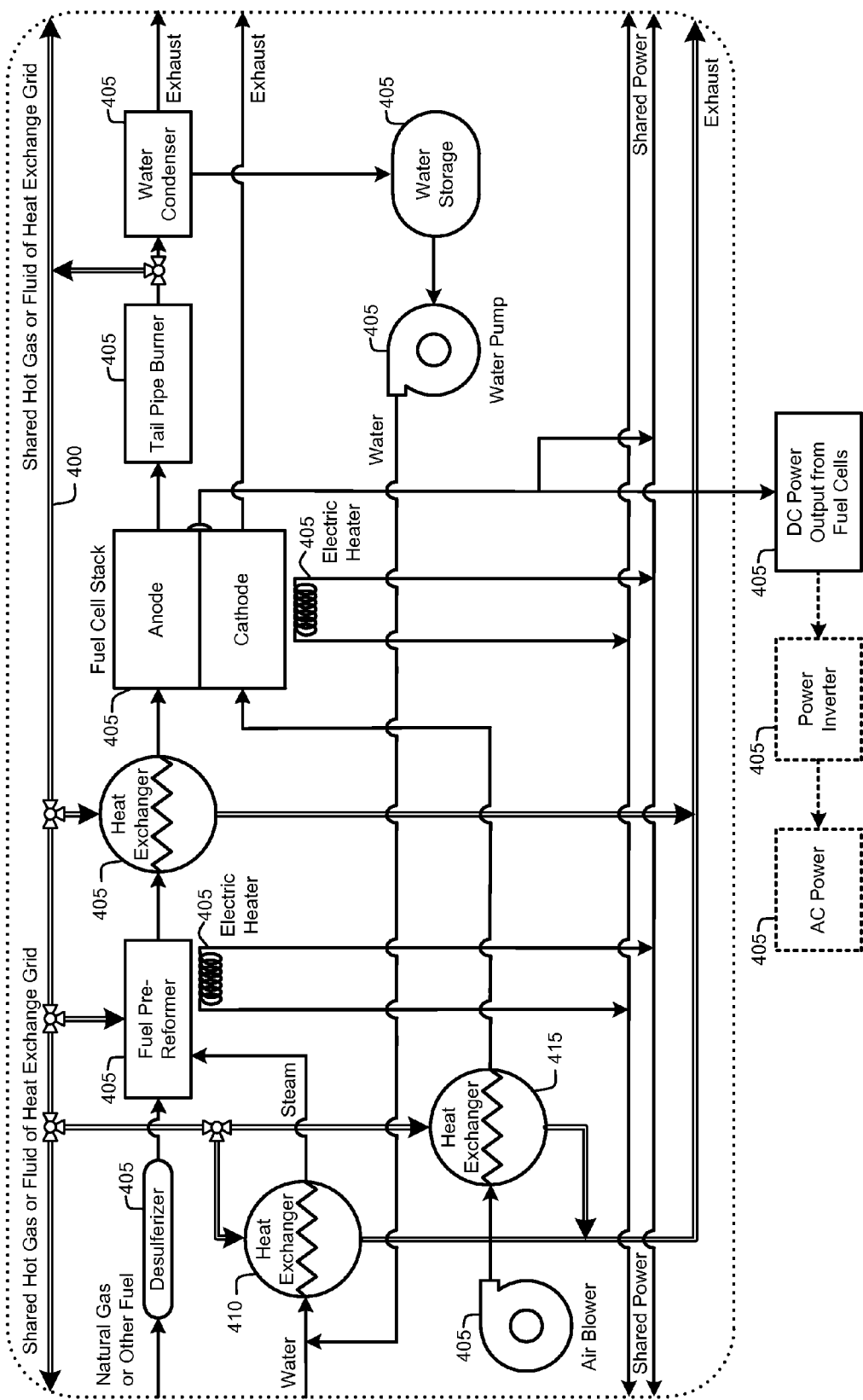
FIG. 4 provides an exemplary schematic diagram showing various for enabling a segment of a larger fuel cell grid, as described herein.

FIG. 4 illustrates a more complex segment of an overall fuel cell grid coupled to a heat exchange grid, though only one fuel cell is illustrated in FIG. 4 for purposes of clarity and explanation. It should be understood that multiple fuel cells are coupled to the heat exchange grid, as discussed hereon. More specifically, FIG. 4 illustrates a segment of a fuel cell grid that includes fuel cell stack 400. This fuel cell stack 400 is coupled to shared hot gas or fluid of heat exchange grid 405.

As illustrated, the heat exchange grid 405 includes a variety of automated valves positioned throughout the heat exchange grid to capture and distribute to and from various components, some or all of which are optional, depending upon the type of fuel cells being used and the type of reaction fuel being provided to those fuel cells. Examples of such components connected to the heat exchange grid 405 include, but are not limited to, fuel cell stack 400, fuel pre-reformer 410, various heat exchangers (415, 420 and 425), and tail pipe burner 430.

In various implementations, the exemplary segment of an overall fuel cell grid illustrated by FIG. 4 include, includes a water condenser 435 for recovering water from exhaust of the fuel cell stack 400 and/or the tail pipe burner 430 (which burns any flammable gas remaining in the exhaust of the fuel stack to generate additional thermal energy). Water recovered by the water condenser 435 can be captured and stored in water storage 440. Further, a water pump 445 can be used to pump water to heat exchanger 420 for use in generating steam for use by the fuel pre-reformer 410. In addition, an air blower 450, or the like, can be used to move air through heat exchanger 425 to superheat that air for use in heating the fuel cell stack 400, as illustrated. FIG. 4 also illustrates optional electric heaters, 455 and 460, for use in providing electric-based heating to the fuel cell stack 400 and the fuel pre-reformer 410, respectively. FIG. 4 also shows that reaction fuel, such as natural gas or other fuel, may be optionally processed by a desulfurizer 465 to remove sulfur contaminants from the reaction fuel, thereby reducing pollutants in the fuel cell 400 exhaust stream.

Finally, FIG. 4 shows that DC electrical power 470 generated by the fuel cell stack 400 is provided as an output of the overall system. This DC electrical power 470 can be optionally provided to a power inverter 475 to produce AC electrical power, if needed. Regardless of whether DC or AC electrical power (or both) is output, that electrical power is then tapped for any desired use.

2.3 Additional Considerations and Implementations:

As noted above, the Cascading Startup Controller can be implemented in a wide range of configurations and with any desired type or mixture of fuel cell types. Further, depending on the amount of power available to begin the initial fuel cell grid startup process, one or multiple fuel cells can be started concurrently, with the excess thermal energy from those initial cells then being used to drive the cascading startup of the remainder of the fuel cell grid. As such, the Cascading Startup Controller acts to bring fuel cells up to operational temperatures for reactivity using heat and/or electrical energy from neighboring cells.

In addition, the Cascading Startup Controller can react to changes in electrical load demand by increasing the heat and fuel distribution to one or more fuel cells, thereby increasing the electrical output of those cells. As such, the Cascading Startup Controller operates in various implementations as a control over transient load balancing where heat is used for stabilization of the fuel cells in the grid. For example, assume that fuel cell is running at steady state, but needs to produce more power due to load demand increases for some reason (e.g., more computers come online, neighboring fuel cell goes offline, etc.). Typically, the fuel cell will produce more power (to a point) as more fuel is provided. However, the fuel is typically cooler than the fuel cell, so using excess heat input to the fuel cell through the heat transfer grid will counterbalance the cooler fuel, thus helping to stabilize the fuel cell temperatures when sending more fuel to increase energy output.

With respect to which fuel cells are used to begin the initial fuel cell grid startup process, the Cascading Startup Controller can select those cells based on various criteria. For example, the Cascading Startup Controller can simply select one or more random fuel cells in the grid. Alternately, the Cascading Startup Controller can select one or more fuel cells closest to the initial power source. Alternately, the Cascading Startup Controller can select one or more cells that are in positions that will reduce distances that thermal energy is transferred to other fuel cells to drive the cascading startup of the remainder of the fuel cell grid. In some cases, this last alternative may mean that the Cascading Startup Controller selects one or more fuel cells for initialization that are at or near the center of the fuel cell grid, or one or more fuel cells along edges of the fuel cell grid, etc., depending upon the geometry of the fuel cell grid.

By way of analogy to a forest fire, the Cascading Startup Controller is acting to start a fire (i.e., heat the initial fuel cell(s) to operational temperature) that then spreads as quickly as possible to other fuel cells without having to start additional fires. In other words, the Cascading Startup Controller boots or initializes one or more fuel cells, and then uses the heat, tail pipe gasses, and electricity from the operating fuel cell to heat the neighboring fuel cells to operational temperatures. The heat, tail pipe gasses, and electricity of those neighbors is then distributed, along with that from the initial fuel cell(s) to the expanding cascade for heating more neighbors to operational temperatures, and so on. This expanding cascade continues until the fuel cell grid is completely initialized, or until some desired number of fuel cells in the fuel cell grid have been initialized.

Another interesting use of the Cascading Startup Controller is to implement a data center or the like as a component of the overall system. In this case, the Cascading Startup Controller monitors available electrical power from running fuel cells, and dynamically boots up more servers of the data center as more power becomes available. In addition, fuel cells can be placed in close proximity to the server racks that they service with electrical power, thereby eliminating significant amount of typical electrical distribution system in the data center.

Figure 5:
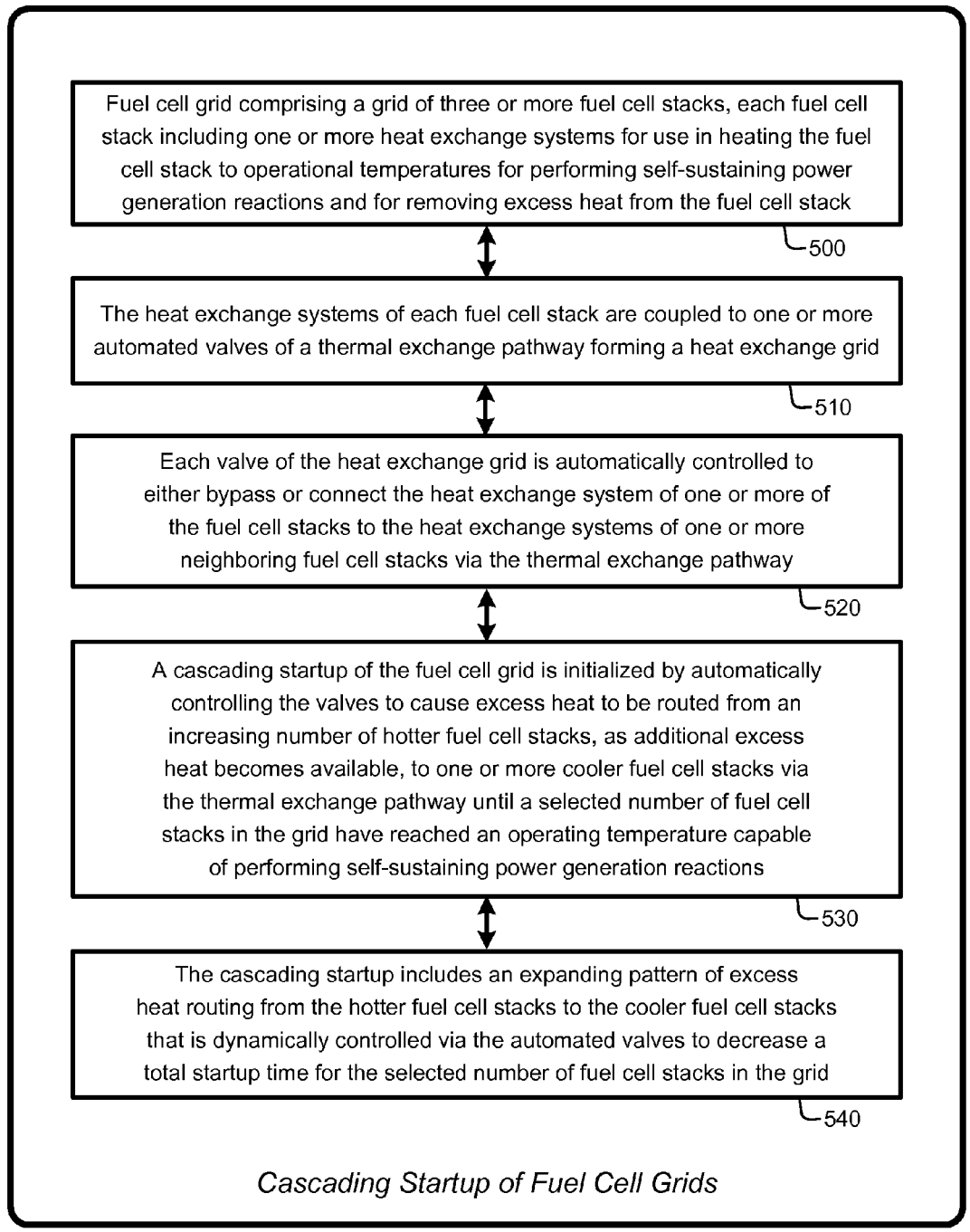
FIG. 5 illustrates a general system flow diagram that illustrates exemplary methods for implementing various implementations of the Cascading Startup Controller, as described herein.

Further considerations for realizing various implementations of the Cascading Startup Controller include, but are not limited to the following:

a. Channeling increasing amounts of heat for fuel reformation as more fuel cells come online, thus preparing more fuel for consumption by fuel cells as they come up to operational temperatures;

b. Use expanding amounts of available electricity to heat cool fuel cells as more fuel cells in the grid come up to operational temperatures and begin generating electricity;

c. Fuel cell grids under the control of the Cascading Startup Controller have increased failure resiliency. For example, since fuel cells are connected in a grid, and the fuel cell grid is connected to the heat transfer grid via dynamically controlled valves, failed or inoperable fuel cells, or fuel cells requiring maintenance, can be isolated from both the fuel cell grid and the heat transfer grid via the automated valves; and d. The heat transfer grid allows the Cascading Startup Controller to preheat fuel cells using heat transfer grid without actually providing fuel to those fuel cells. This allows pre-heated fuel cells to be kept on standby to generate electricity as soon as fuel is provided;

3.0 Operational Summary of the Cascading Startup Controller:

The processes described above with respect to FIG. 1 through FIG. 4, and in further view of the detailed description provided above in Sections 1 and 2, are illustrated by the general operational flow diagram of FIG. 5. In particular, FIG. 5 provides an exemplary operational flow diagram that summarizes the operation of some of the various implementations of the Cascading Startup Controller. Note that FIG. 5 is not intended to be an exhaustive representation of all of the various implementations of the Cascading Startup Controller described herein, and that the implementations represented in FIG. 5 are provided only for purposes of explanation.

In general, as illustrated by FIG. 5, the Cascading Startup Controller operates using a fuel cell grid comprising a grid (500) of three or more fuel cell stacks. Each of these fuel cell stacks include one or more heat exchange systems for use in heating the fuel cell stack to operational temperatures for performing self-sustaining power generation reactions and for removing excess heat from the fuel cell stack. The heat exchange systems of each fuel cell stack are coupled (510) to one or more automated valves of a thermal exchange pathway forming a heat exchange grid.

Each valve of the heat exchange grid is automatically controlled (520) to either bypass or connect the heat exchange system of one or more of the fuel cell stacks to the heat exchange systems of one or more neighboring fuel cell stacks via the thermal exchange pathway.

A cascading startup (530) of the fuel cell grid is initialized by automatically controlling the valves to cause excess heat to be routed from an increasing number of hotter fuel cell stacks, as additional excess heat becomes available, to one or more cooler fuel cell stacks. This excess heat is routed via the thermal exchange pathway until a selected number of fuel cell stacks in the grid have reached an operating temperature capable of performing self-sustaining power generation reactions.

The cascading startup includes an expanding pattern (540) of excess heat routing from the hotter fuel cell stacks to the cooler fuel cell stacks that is dynamically controlled via the automated valves to decrease a total startup time for the selected number of fuel cell stacks in the grid.

Figure 6:
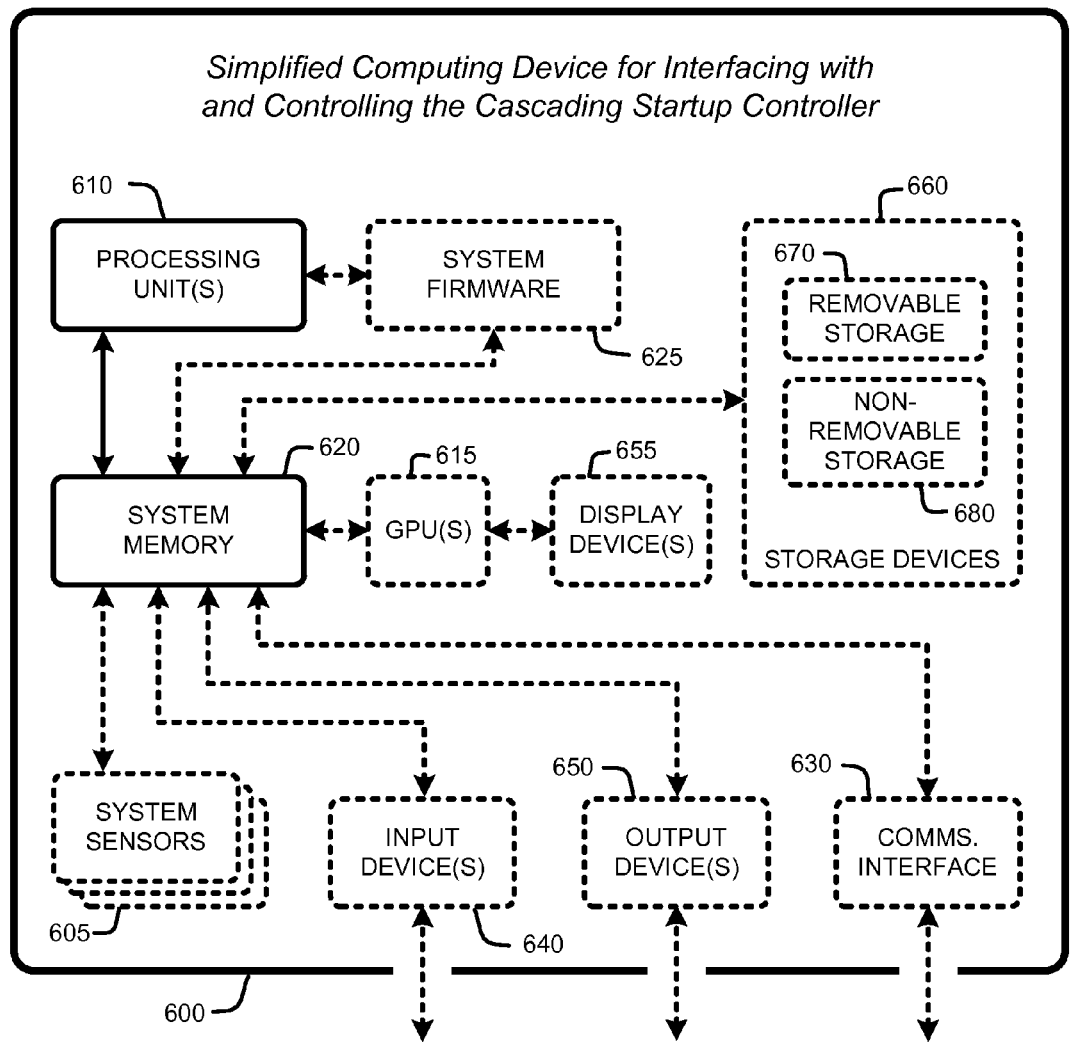
FIG. 6 is a general system diagram depicting a simplified general-purpose computing device having simplified computing and I/O capabilities for use in implementing various implementations of the Cascading Startup Controller, as described herein.

4.0 Exemplary Operating Environments:

The Cascading Startup Controller described herein is operational within numerous types of general purpose or special purpose computing system environments or configurations. FIG. 6 illustrates a simplified example of a general-purpose computer system on which various implementations and elements of the Cascading Startup Controller, as described herein, may be implemented. It should be noted that any boxes that are represented by broken or dashed lines in FIG. 6 represent alternate implementations of the simplified computing device, and that any or all of these alternate implementations, as described below, may be used in combination with other alternate implementations that are described throughout this document.

For example, FIG. 6 shows a general system diagram showing a simplified computing device 600. Examples of such devices operable with the Cascading Startup Controller, include, but are not limited to, portable electronic devices, wearable computing devices, hand-held computing devices, laptop or mobile computers, communications devices such as cell phones, smartphones and PDA's, multiprocessor systems, microprocessor-based systems, set top boxes, programmable consumer electronics, network PCs, minicomputers, audio or video media players, handheld remote control devices, etc. Note also that the Cascading Startup Controller may be implemented with any touchscreen or touch-sensitive surface that is in communication with, or otherwise coupled to, a wide range of electronic devices or objects.

To allow a device to implement the Cascading Startup Controller, the computing device 600 should have a sufficient computational capability and system memory to enable basic computational operations. In the present case, the Cascading Startup Controller automatically monitors conditions such as fuel cell temperatures, reaction fuel temperatures, current or predicted electrical load demand, etc., and uses this information to dynamically control valves of the heat transfer grid via the computing device 600. The Cascading Startup Controller also uses this information to control reaction fuel distribution to the fuel cells via the computing device 600. In addition, the Cascading Startup Controller uses this information to control fuel cell cooling via the computing device 600. Note that automatic valves and techniques for interfacing and controlling such devices using a computer are well known to those skilled in the art, and will not be described herein.

In addition, the computing device 600 may include one or more sensors 605, including, but not limited to, thermocouples, infrared temperature meters, accelerometers, cameras, capacitive sensors, proximity sensors, microphones, multi-spectral sensors, etc. Further, the computing device 600 may also include optional system firmware 625 (or other firmware or processor accessible memory or storage) for use in implementing various implementations of the Cascading Startup Controller.

As illustrated by FIG. 6, the computational capability of computing device 600 is generally illustrated by one or more processing unit(s) 610, and may also include one or more GPUs 615, either or both in communication with system memory 620. Note that that the processing unit(s) 610 of the computing device 600 may be a specialized microprocessor, such as a DSP, a VLIW, or other micro-controller, or can be a conventional CPU having one or more processing cores, including specialized GPU-based cores in a multi-core CPU.

In addition, the simplified computing device 600 may also include other components, such as, for example, a communications interface 630. The simplified computing device 600 may also include one or more conventional computer input devices 640 or combinations of such devices (e.g., touchscreens, touch-sensitive surfaces, pointing devices, keyboards, audio input devices, voice or speech-based input and control devices, video input devices, haptic input devices, devices for receiving wired or wireless data transmissions, etc.). The simplified computing device 600 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device 600 may also include a variety of computer readable media. Computer readable media can be any available media that can be accessed via storage devices 660 and includes both volatile and nonvolatile media that is either removable 670 and/or non-removable 680, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various implementations of the Cascading Startup Controller described herein, or portions thereof, may be stored, received, transmitted, or read from any desired combination of computer or machine readable media or storage devices and communication media in the form of computer executable instructions or other data structures.

Finally, the Cascading Startup Controller described herein may be further described in the general context of computer-executable instructions, such as program modules, being executed by a computing device. Generally, program modules include routines, programs, objects, components, data structures, etc., that perform particular tasks or implement particular abstract data types. The implementations described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Cascading Startup Controller has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the Cascading Startup Controller. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fuel cell startup system comprising:
 a grid of three or more fuel cell stacks, each fuel cell stack including one or more heat exchange systems for use in heating the fuel cell stack to an operating temperature that allows the fuel cell stack to perform self-sustaining power generation reactions and for use in removing excess heat from the fuel cell stack;
 the heat exchange systems of each fuel cell stack being coupled to one or more automated valves of a thermal exchange pathway;

each valve being automatically controlled to either bypass or connect the heat exchange system of one or more of the fuel cell stacks to the heat exchange systems of one or more neighboring fuel cell stacks via the thermal exchange pathway;

initializing a cascading startup of the grid of three or more fuel cell stacks by automatically controlling the valves to cause excess thermal energy to be routed from an increasing number of hotter fuel cell stacks, as additional excess thermal energy becomes available, to one or more cooler fuel cell stacks via the thermal exchange pathway;

continuing the cascading startup until a selected number of fuel cell stacks in the grid of three or more fuel cell stacks have reached an operating temperature capable of performing self-sustaining power generation reactions when supplied with reaction fuel; and wherein the cascading startup includes an expanding pattern of excess thermal energy routing from the hotter fuel cell stacks to the cooler fuel cell stacks that is dynamically controlled via the automated valves to decrease a total startup time for the selected number of fuel cell stacks in the grid.

2. The fuel cell startup system of claim 1 further comprising placing one or more fuel cell stacks in a standby condition by using the thermal exchange pathway to preheat those fuel cell stacks to an operational temperature without supplying reaction fuel to the preheated fuel cell stacks.

3. The fuel cell startup system of claim 1 further comprising automatically adapting to transient increases in load demand by increasing the temperature of one or more fuel cell stacks by automatically controlling the valves to cause excess thermal energy to be routed to those fuel cell stacks and increasing a flow of reaction fuel to those fuel cell stacks.

4. The fuel cell startup system of claim 1 wherein one or more of the fuel cell stacks further include an electrical heater device, said electrical heater device receiving electrical power during the cascading startup from one or more fuel cell stacks that are performing self-sustaining power generation reactions.

5. The fuel cell startup system of claim 1 further comprising capturing waste heat from one or more server computers and using that waste heat to partially preheat one or more of the fuel cell stacks.

6. The fuel cell startup system of claim 1 further comprising a user interface for initiating cooling in one or more of the fuel cell stacks.

7. The fuel cell startup system of claim 1 further comprising a cooling loop for cooling one or more of the fuel cell stacks.

8. The fuel cell startup system of claim 1 wherein excess thermal energy available to the thermal exchange pathway is provided for use in reforming the reaction fuel.

9. The fuel cell startup system of claim 1 further comprising using a tail pipe burner to burn exhaust gas from one or more of the fuel cell stacks, and using thermal energy from the burning exhaust gas to provide additional thermal energy for heating one or more cooler fuel cell stacks.

10. The fuel cell startup system of claim 1 wherein the fuel cell grid is fully disconnected from an external electrical grid.

11. A fuel cell grid, comprising:
a grid of three or more fuel cell stacks coupled to a heat exchange grid;

wherein the heat exchange grid includes a plurality of computer-controlled automated valves for distributing thermal energy between any of the fuel cell stacks;

a computing device for initializing a cascading startup of the grid of three or more fuel cell stacks by automatically controlling the valves to cause excess thermal energy to be routed from an increasing number of operational fuel cell stacks to one or more cooler fuel cell stacks via the heat exchange grid;

wherein the cascading startup continues until a selected number of fuel cell stacks have become operational by reaching an operating temperature capable of performing self-sustaining power generation reactions when supplied with reaction fuel; and wherein the cascading startup includes an expanding pattern of excess thermal energy routing from the operational fuel cell stacks to the cooler fuel cell stacks that is dynamically controlled by the computing device via the automated valves to decrease a startup time for the selected number of fuel cell stacks in the grid.

12. The fuel cell grid of claim 11 further comprising one or more racks of computing devices, each rack of computing devices co-located near one or more of the fuel cell stacks, and receiving electrical power from one or more of the co-located fuel cell stacks.

13. The fuel cell grid of claim 12 further comprising collecting waste heat from one or more of the racks of computing devices and using that waste heat to partially preheat one or more fuel cell stacks.

14. The fuel cell grid of claim 11 further comprising placing one or more fuel cell stacks in a standby condition by using the heat exchange grid to preheat those fuel cell stacks to an operational temperature without supplying reaction fuel to the preheated fuel cell stacks.

15. The fuel cell grid of claim 11 further comprising a cooling loop for cooling one or more of the fuel cell stacks.

16. The fuel cell grid of claim 11 wherein one or more of the fuel cell stacks further include an electrical heater device, said electrical heater device receiving electrical power during the cascading startup from one or more operational fuel cell stacks.

17. A computer-readable storage device having computer executable instructions stored therein for performing a cascading startup of a fuel cell grid, said instructions causing a computing device to perform actions comprising:

controlling a plurality of computer-controlled automated valves coupled to a heat exchange grid to distribute thermal energy between any fuel cell stacks in a grid of three or more fuel cell stacks;

initializing a cascading startup of the grid of three or more fuel cell stacks by automatically controlling the valves to cause excess thermal energy to be routed from an increasing number of operational fuel cell stacks to one or more cooler fuel cell stacks via the heat exchange grid;

continuing the cascading startup until a selected number of fuel cell stacks have become operational by reaching an operating temperature capable of performing self-sustaining power generation reactions when supplied with reaction fuel; and wherein the cascading startup includes an expanding pattern of excess thermal energy routing from the operational fuel cell stacks to the cooler fuel cell stacks that is dynamically controlled by the computing device via the automated valves to decrease a startup time for the selected number of fuel cell stacks in the grid.

18. The computer-readable storage device of claim 17 further comprising controlling the heat exchange grid to distribute waste heat collected from one or more computing devices to partially preheat one or more fuel cell stacks.

19. The computer-readable storage device of claim 17 wherein one or more of the fuel cell stacks further include an electrical heater device, said electrical heater device receiving electrical power during the cascading startup from one or more operational fuel cell stacks.

20. The computer-readable storage device of claim 17 further comprising a user interface for selectively controlling heat transfer with respect to one or more selected fuel cell stacks.

* * * * *